UNITED STATES PATENT OFFICE.

OTTO BORGMANN, OF BERLIN, GERMANY, ASSIGNOR TO THE ACTIEN-GESELLSCHAFT FÜR ANILIN FABRIKATION, OF SAME PLACE.

RED DYE.

SPECIFICATION forming part of Letters Patent No. 468,539, dated February 9, 1892.

Application filed December 16, 1890. Serial No. 374,938. (No specimens.)

*To all whom it may concern:*

Be it known that I, OTTO BORGMANN, doctor of philosophy, a subject of the King of Prussia, residing at Berlin, German Empire, have invented certain new and useful Improvements in the Production of a New Red Coloring-Matter or Dye-Stuff; and I do hereby declare the following to be a full, clear, and exact description of the invention, such as will enable others skilled in the art to which it appertains to make and use the same.

The invention relates to the production of a new red coloring-matter or dye-stuff, and is based upon the processes described in Letters Patent of the United States granted to Carl A. Martius, under date of July 6, 1886, No. 344,971, and in British Letters Patent granted to the Actien-Gesellschaft für Anilin Fabrikation, of Berlin, under date of February 4, 1887, No. 6,687, for the production of mixed azo dyes by the combination of one molecule of a salt of the tetrazo-diphenyl or tetrazo-ditolyl with one molecule of an aromatic amido compound, and by combining the product thus obtained with one molecule of a different amido compound or with a phenol. It has since been found that beta-naphthylamine disulpho-acid R, corresponding with beta-naphthol disulpho-acid R, may be used in the processes referred to as an "amido compound," and that the dye-stuffs such as described in said British patent can be obtained by the combining of the intermediate product obtained from tetrazo-diphenyl or tetrazo-ditolyl and beta-naphthylamine disulpho-acid R with beta-naphthylamine, beta-naphthylamine beta-monosulpho-acid, phenol or alpha-naphthol.

I have discovered that when the tetrazo-ditolyl and beta-naphthylamine disulpho-acid R, according to the last-named process, are employed and the naphthionic acid (alpha-naphthylamine alpha-monosulpho-acid of Piria) is substituted for the beta-naphthylamine, beta-monosulpho-acid (or beta-naphthylamine, phenol or alpha-naphthol) a new red dye-stuff is obtained that not only exceeds those heretofore obtained in brilliancy, but dyes cotton without the use of a mordant, and is proof against atmospheric influences as well as against the action of light soap and alkalies.

In carrying out my invention I dissolve 21.2 kilos tolidine, under addition of ninety kilos of hydrochloric acid of about 12° Baumé, in about five hundred liters of water. The solution is then cooled with ice and diazotized by means of about fourteen kilos of sodium nitrite in a well-known manner. The diazo compound obtained is next run into a solution of about thirty-eight kilos beta-naphthylamine disulphonate R of soda and of about twenty-five kilos of acetate of soda in about four hundred liters of water, and the mixture is stirred for some hours, during which the intermediate product is formed, and when so formed a concentrated solution of about thirty-eight kilos of naphthionate of soda is added and the mixture is allowed to stand for several days. The mixture is then heated to boiling, neutralized with caustic soda, and the dye-stuff salted out, pressed and dried.

The dye-stuff has the following composition:

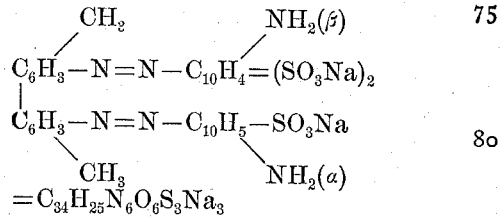

$$= C_{34}H_{25}N_6O_6S_3Na_3$$

The dye-stuff consists of a red powder readily soluble in hot water, but insoluble in alcohol. Concentrated sulphuric acid dissolves the dye-stuff with a deep green-blue color, which on adding water is converted into black-green under precipitation of its free acid.

When acetic acid is added to an aqueous solution of the dye-stuff, it turns violet-red, while under the action of mineral acids a gray-blue precipitate results. By the addition of a caustic soda-lye the dye-stuff separates in the form of a fine red precipitate, while said coloring-matter is destroyed by the action of a reducing agent, tolidine and diamido-naphthaline mono and disulpho acids resulting from the reaction.

The dye-stuff dyes cotton a brilliant red in an alkaline or soap bath containing a small quantity of phosphate of soda, or carbonate of potash, or borax, or stannate of soda.

Having described my invention, what I claim is—

1. The process of obtaining red dye-stuffs, which consists in combining a diazo compound of tolidine with beta-naphthylamine disulpho-acid R, adding to the resulting intermediate body naphthionate of soda, allowing the mixture to stand until the reaction is complete, neutralizing with an alkali, and salting out the dye-stuff.

2. As an article of manufacture, the described red dye-stuff, readily soluble in hot water, insoluble in alcohol, precipitable with alkalies from aqueous solutions, dissolving in concentrated sulphuric acid with a greenish-blue color, and decomposed by reducing agents into tolidine and diamido-naphthaline mono and disulpho acids.

In testimony whereof I affix my signature in presence of two witnesses.

OTTO BORGMANN.

Witnesses:
GEORGE LUNBIER,
ADOLPH DEMELIUS.